United States Patent
Wanie et al.

(10) Patent No.: US 6,766,633 B2
(45) Date of Patent: Jul. 27, 2004

(54) YARD WASTE HOPPER AND METHOD OF USING THE SAME

(75) Inventors: Todd R. Wanie, Mayville, WI (US); Kevin M. Kurtz, Horicon, WI (US)

(73) Assignee: Scag Power Equipment, Inc., Mayville, WI (US)

(*) Notice: Subject to any disclaimer, the term of this patent is extended or adjusted under 35 U.S.C. 154(b) by 0 days.

(21) Appl. No.: 10/292,219

(22) Filed: Nov. 12, 2002

(65) Prior Publication Data

US 2004/0088961 A1 May 13, 2004

(51) Int. Cl.$^7$ .............................................. A01D 34/70
(52) U.S. Cl. ......................................................... 56/202
(58) Field of Search ........................ 56/16.4 A, 16.4 B, 56/16.6, 196, 197, 199–206, 14.4, 14.3, DIG. 12

(56) References Cited

U.S. PATENT DOCUMENTS

| | | |
|---|---|---|
| 4,034,438 A | 7/1977 | Csokasy et al. |
| 4,069,649 A | 1/1978 | Mullet et al. |
| RE29,545 E | 2/1978 | Deisenroth |
| 4,103,477 A | 8/1978 | Mullet et al. |
| 4,487,007 A | 12/1984 | Mullet et al. |
| 4,523,788 A | 6/1985 | Prasad |
| 4,532,756 A | 8/1985 | Merkel |
| 4,569,187 A | 2/1986 | Spiker et al. |
| 4,596,347 A | 6/1986 | Hite |
| 4,709,541 A | 12/1987 | Broman et al. |
| 4,924,664 A | 5/1990 | Hicks et al. |
| 4,969,320 A | * 11/1990 | Langford ..................... 56/16.6 |
| 4,972,666 A | 11/1990 | Peruzzon |
| 5,076,045 A | * 12/1991 | McClung, IV ............... 56/202 |
| 5,134,838 A | * 8/1992 | Swisher et al. .............. 56/16.6 |
| 5,152,128 A | * 10/1992 | Stoican ........................ 56/202 |
| 6,105,350 A | 8/2000 | Vachon et al. |

* cited by examiner

Primary Examiner—Robert E Pezzuto
(74) Attorney, Agent, or Firm—Boyle Fredrickson Newholm Stein & Gratz S.C.

(57) ABSTRACT

A hopper for a lawn tractor. The hopper includes a plurality of walls. The walls together define an interior space and an opening communicating with the interior space. A door is movably coupled to at least one of the plurality of walls and is movable between a closed position, in which the door substantially covers the opening, and an open position, in which, the opening is at least partially uncovered. A sweep assembly is movable within the interior space when the door is moved between the closed and open positions. Preferably, the sweep assembly includes a frame coupled to the door and a sweep coupled to the frame. The sweep is preferably a flexible member that engages at least one of the plurality of walls. Preferably, the hopper also includes a latching mechanism coupled to the at least one of the plurality of walls.

38 Claims, 4 Drawing Sheets

_US 6,766,633 B2_

YARD WASTE HOPPER AND METHOD OF USING THE SAME

FIELD OF THE INVENTION

The invention relates to lawn tractors, and more specifically to a hopper mounted on a lawn tractor for the collection of yard waste.

BACKGROUND OF THE INVENTION

Conventional lawn tractors generally include an operator seat and a mower deck housing a cutting blade. Many lawn tractors also include a hopper mounted on the tractor behind the operator seat and a duct for conveying grass clippings and yard waste from the mower deck to the hopper. During operation, the hopper is filled with yard waste and must be periodically emptied. Generally, the contents of the hopper are dumped in a pile or emptied into trash cans.

SUMMARY OF THE INVENTION

The present invention provides a hopper for a lawn tractor. The hopper includes a number of walls. The walls together define an interior space and an opening communicating with the interior space. A door is movably coupled to at least one of the walls and is movable between a closed position, in which the door substantially covers the opening, and an open position, in which the opening is at least partially uncovered. A sweep assembly is movable within the interior space when the door is moved between the closed and open positions.

In one aspect of the invention, the sweep assembly includes a frame coupled to the door and a sweep coupled to the frame. The sweep engages at least one of the walls. The sweep is preferably a flexible member and at least one of the walls is sloped downwardly toward the opening.

In another aspect of the invention, the hopper includes a latching mechanism coupled to at least one of the walls. The latching mechanism is operable to secure the door in the closed position. More specifically, the latching mechanism has a locked condition, in which the latching mechanism secures the door in the closed position, and an unlocked condition, in which the door is movable to the open position.

In yet another aspect of the invention, an actuator is coupled to at least one of the walls. The actuator is operable to move the door between the closed position and the open position. More specifically, the actuator includes a first elongated member having a first end and a second end. The first elongated member is pivotably coupled to at least one of the plurality of walls. A second elongated member has a third end and a fourth end. The third end is pivotably coupled to the second end and the fourth end is pivotably coupled to the door. A handle is coupled to the first end for pivoting the first elongated member with respect to at least one of the walls.

In another aspect of the invention, the actuator is coupled to the latching mechanism and is operable to move the latching mechanism between the locked condition and the unlocked condition.

In still another aspect of the invention, the hopper is mounted on a lawn tractor having wheels supporting a chassis and a mower deck coupled to the chassis. The mower deck houses a cutting blade. The lawn tractor can include an operator seat supported by the chassis and the actuator can be positioned adjacent the operator seat.

In addition, the present invention provides a method of operating the hopper. The method includes moving the door from the closed position toward the open position, moving the sweep assembly within the interior space toward the opening, and moving yard waste out of the interior space through the opening with the sweep assembly. In one aspect of the invention, the sweep assembly moves toward the opening at substantially the same time as the door moves from the closed position toward the open position.

Other features and advantages of the invention will become apparent to those skilled in the art upon review of the following detailed description, claims, and drawings.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE PREFERRED EMBODIMENT

As used herein and in the appended claims, the term "yard waste" includes organic materials commonly found on lawns, such as, for example, grass, grass clippings, thatch, leaves, twigs, seed pods, and the like. Also, as used herein and in the appended claims, the term "yard waste" includes non-organic materials, such as, for example, litter, stones, and the like. Additionally, the terms "top", "forward", "rearward", "front", "back", and "bottom" as used herein and in the appended claims are for the purposes of description only and are not intended to imply any particular orientation.

Figure 1:
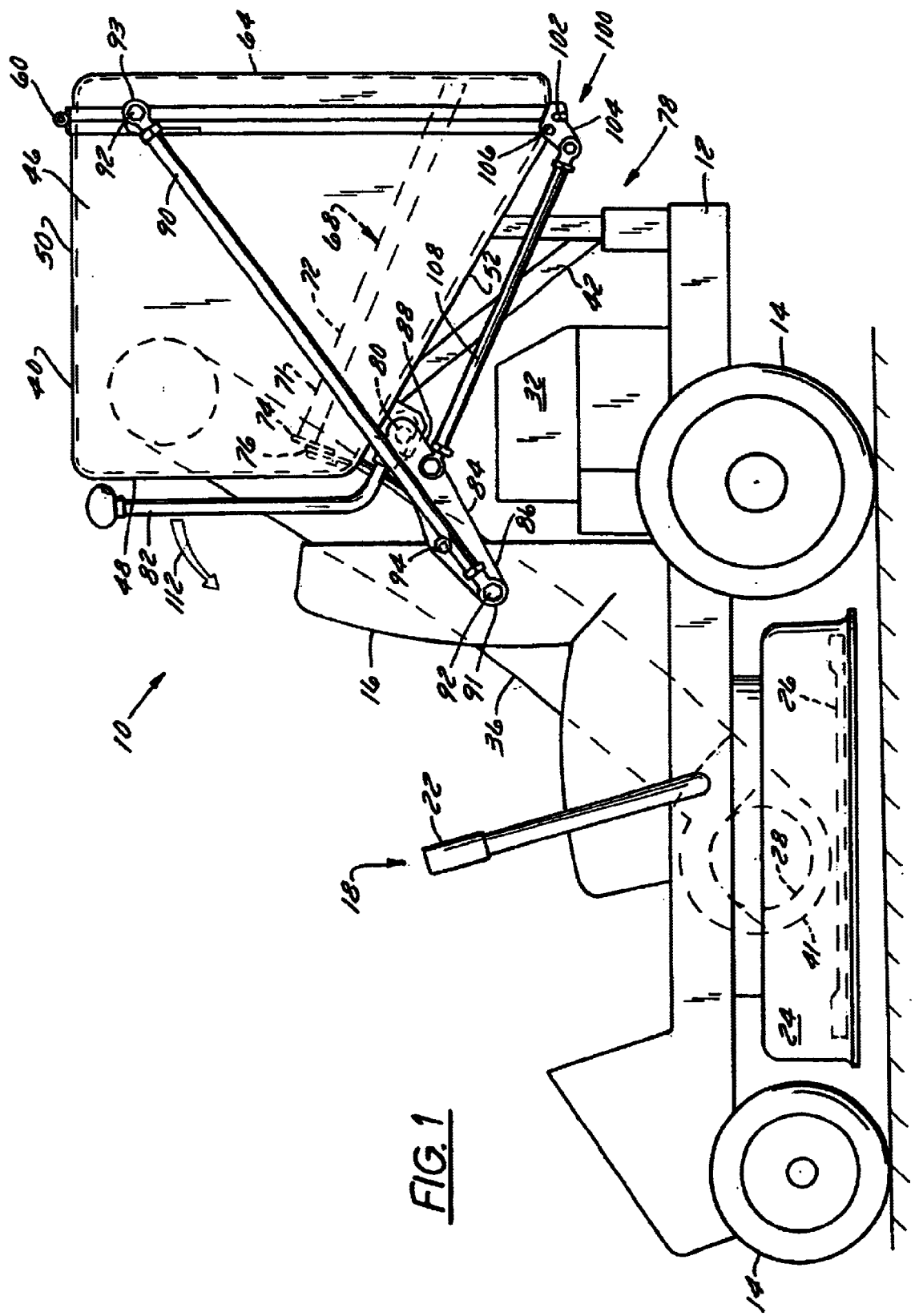
FIG. 1 is a side view of a lawn tractor embodying the present invention.

FIG. 1 illustrates a lawn tractor 10, including a chassis 12 supported by wheels 14. An operator seat 16 is mounted on the chassis 12 between the wheels 14 and adjacent a number of operator controls 18, including a pair of control levers 22 (only one shown in FIG. 1) for steering the tractor 10. In other constructions (not shown), the operator controls 18 can include a steering wheel, a steering yoke, and the like.

A cutting deck 24 is located between the wheels 14 and is suspended from the chassis 12 below the operator seat 16. The cutting deck 24 houses one or more blades 26 (only one is shown), which rotate about a cutting axis to cut grass and/or to create a vacuum that draws yard waste into the cutting deck 24 in a known manner. As shown in FIG. 1, the cutting deck 24 includes a discharge opening 28. During operation, yard waste is expelled from the cutting deck 24 via the discharge opening 28.

A prime mover 32 is located behind the operator seat 16. In cooperation with a drive train (not shown), the prime mover 32 drives one or more of the wheels 14 and supplies the motive force required to move the tractor 10. In addition, the prime mover 32 supplies the motive force required to rotate the blade 26 about the blade axis. In the illustrated construction, the prime mover 32 is a gasoline powered internal-combustion engine.

A duct 36 is connected at one end to the discharge opening 28 and extends upwardly and away from the cutting deck 24. During operation, yard waste expelled from the cutting deck 24 via the discharge opening 28 is directed through the duct 36 into a hopper 40 (described below). In the illustrated construction, the blade 26 and a blower assembly 41 provide the necessary motive force to blow yard waste through the duct 36 into the hopper 40. In some constructions (not shown), the duct 36 can operate without a blower assembly 41. In these constructions, the blade 26 alone can propel yard waste through the duct 36 from the cutting deck 24 to the hopper 40.

With reference now to FIGS. 1–4, a frame 42 is located behind the prime mover 32 and supports the hopper 40. The hopper 40 includes a right side wall 44, a left side wall 46, a front wall 48 extending between the right and left side walls 44, 46, a top wall 50 extending substantially horizontally across the right, left, and front walls 44, 46, 48, and a bottom wall 52 coupled to the right, left, and front walls 44, 46, 48. The bottom wall 52 is angled or sloped downwardly away from the front wall 48 to facilitate the removal of yard waste W (represented generally in FIG. 4) from the hopper 40. Together, the right, left, front, top, and bottom walls 44, 46, 48, 50, 52 define an interior space 54 (see FIG. 4). The right side wall 44 also includes an inlet opening 56 (see FIG. 4), which provides communication between the duct 36 and the interior space 54.

Rearward edges of each of walls 44, 46, 50, 52 together define an opening 58 (see FIG. 4) that communicates with the interior space 54. One or more hinges 60 pivotably couple a door 64 to the top wall 50. The door 64 is movable between a closed position (shown in FIGS. 1, 2, and 3), wherein the door 64 substantially covers the opening 58, and an open position (shown in FIG. 4 and in phantom in FIG. 3), wherein the opening is at least partially uncovered. During operation of the lawn tractor 10, the door 64 is generally maintained in the closed position. When the hopper 40 is full and/or after a job is completed, the door 64 is moved to the open position and the contents of the hopper 40 (e.g., yard waste W) are removed from the hopper 40 via the opening 58, as explained in more detail below.

Figure 2:
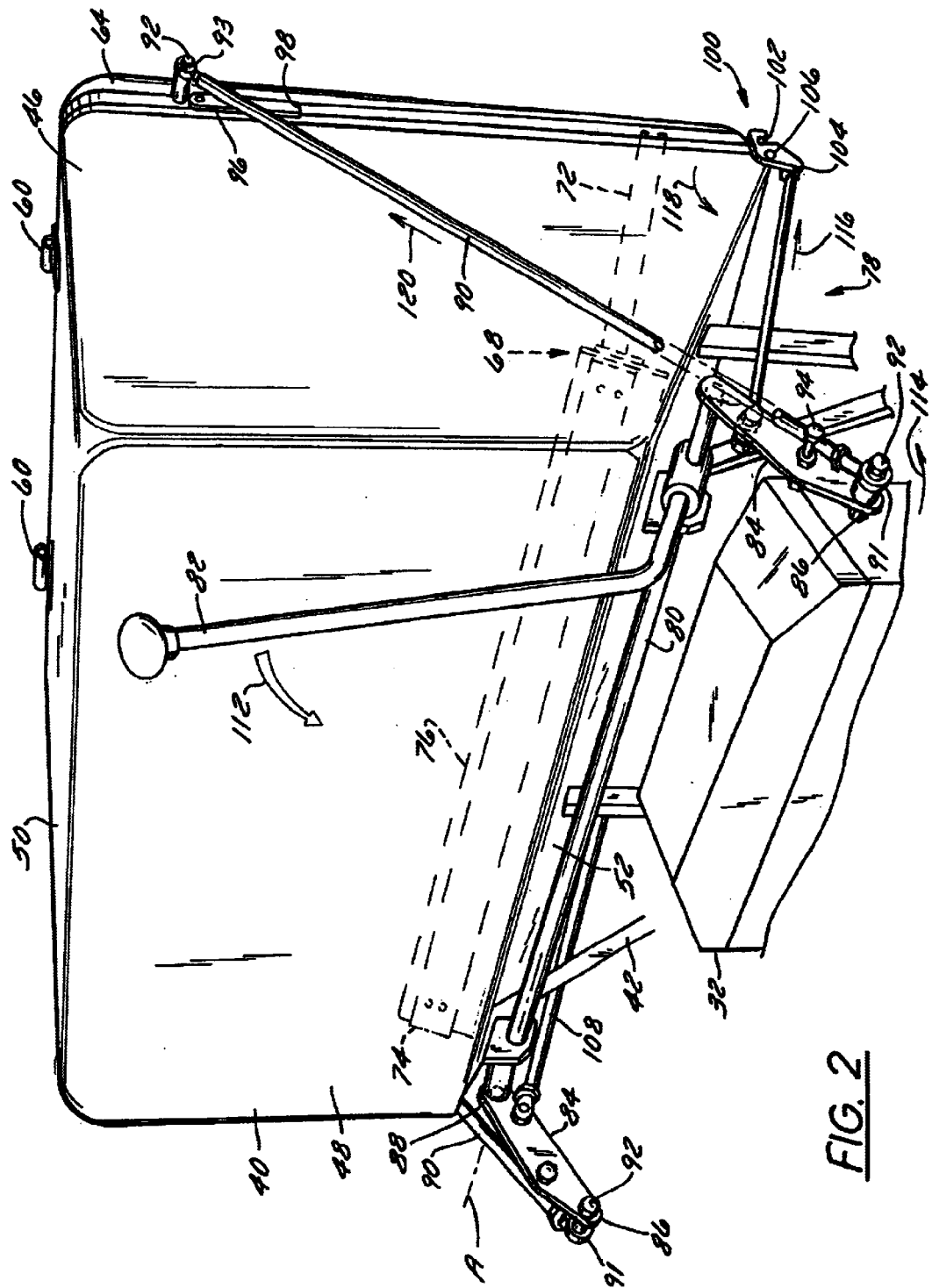
FIG. 2 is a front perspective view of a hopper shown in FIG. 1.

As shown in FIGS. 1–4, the hopper 40 further includes a sweep assembly 68 movably positioned in the interior space 54. The sweep assembly 68 includes a frame 71, having two arms 72 (only one is shown in each of the FIGS. 1–4) coupled to the interior surface of the door 64, two crossbars 74 extending between the arms 72, and a sweep 76 held between the crossbars 74 for movement with the frame 71 through the interior space 54. As illustrated in FIG. 2, the sweep 76 extends across a substantial portion of the width of the hopper 40, however, in some constructions, the sweep 76 can extend across less of the width of the hopper 40. In other constructions, the sweep 76 could be formed by multiple shorter sweep segments (not shown). In the illustrated construction, the sweep 76 is a flexible member (e.g., a sheet of rubber, plastic, and the like) so that the sweep 76 can deform to overcome inequalities in, and adjust to the contours of, the bottom wall 52 as the sweep 76 is moved through the interior space 54.

Figure 3:
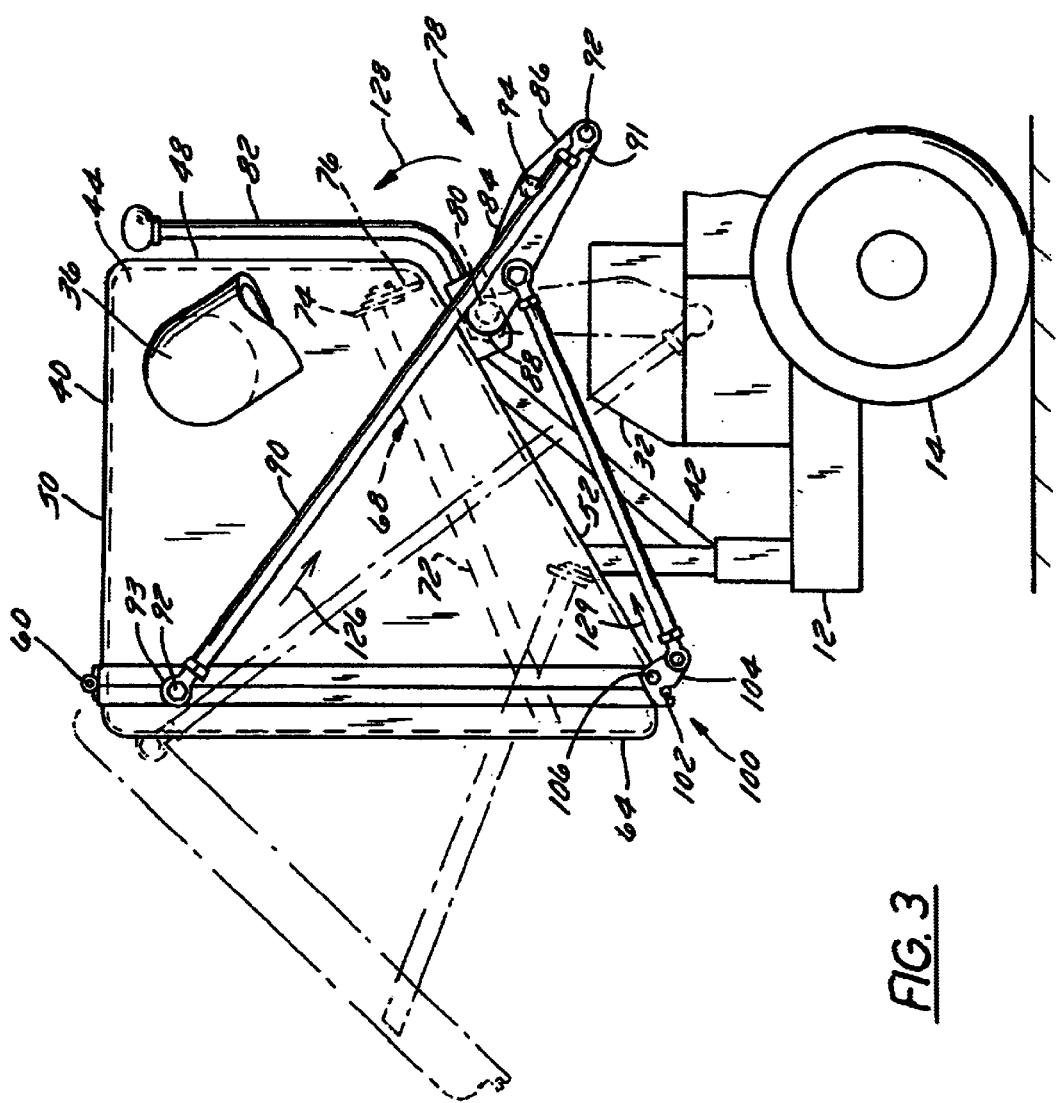
FIG. 3 is a side view of the hopper show in FIG. 1.
Figure 4:
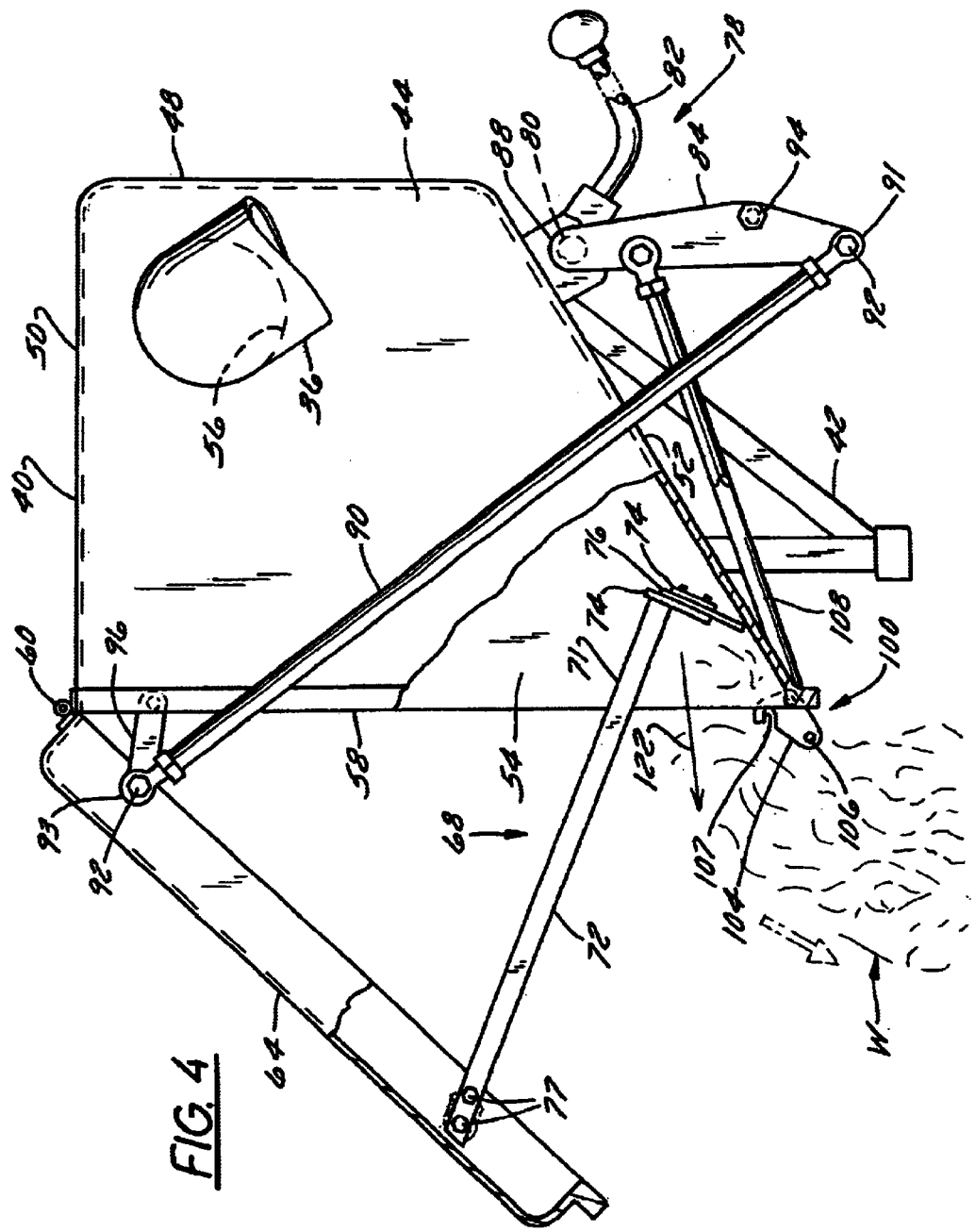
FIG. 4 is a side view, partially in section, of the hopper shown in FIG. 1.

In the illustrated construction, the arms 72 are coupled to the door 64 with fasteners 77 and/or are welded to the door 64 so that at least a portion of the sweep 76 substantially maintains engagement with the bottom wall 52 as the sweep assembly 68 is moved through the interior space 54 with the opening and closing of the door 64. In different constructions of the present invention, the specific mounting arrangement can vary depending on the size and shape of the hopper 40, the sweep assembly 68, and the configuration of the bottom wall 52. In FIG. 4, the arms are shown welded and bolted to the door 64, but other connecting methods, including pivotal connections can also be used. When the door 64 is in the closed position (e.g., during operation of the lawn tractor 10) the sweep 76 is located near a forward portion of the interior space 54 and can be located adjacent the front wall 48, as shown in FIGS. 1–3. As the door 64 is opened, the frame 71 moves the sweep 76 across the bottom wall 52 toward the opening 58, as shown in FIG. 4. As the sweep 76 is moved toward the opening 58, the sweep 76 moves at least some of the contents of the interior space 54 (e.g., yard waste W) toward the opening 58 and out of the hopper 40.

Depending upon the point of reference, the motion of the sweep 76 and/or the sweep assembly 68 through the interior space 54 can be described as either pushing or pulling yard waste W out of the hopper 40. For example, the sweep 76 can be viewed independently as pushing yard waste W rearwardly through and out of the interior space 54. Alternatively, the sweep assembly 68, including the sweep 76, can be viewed together as pulling yard waste W rearwardly through and out of the interior space 54 via the opening 58. Therefore, as used herein and in the appended claims, the terms "move" and "moving" as used to describe the motion of the sweep 76, the sweep assembly 68, and/or the yard waste W, are intended to describe the pushing/pulling action irrespectively of the point of reference chosen.

Depending on the specific shape of the bottom wall 52, the sweep 76 can periodically come out of contact with the bottom wall 52 during travel. Additionally, the sweep 76 could still operate to move yard waste W out of the hopper 40 without being in contact with the bottom wall 52.

As shown in FIGS. 1–4, an actuator assembly 78 is coupled to the hopper 40 and the frame 42. The actuator assembly 78 includes a control shaft 80 that extends across the exterior side of the bottom wall 52 between two sides of the frame 42 and defines a control shaft axis A (see FIG. 2). The actuator assembly 78 also includes a handle or lever 82 coupled to one end of the control shaft 80. In the illustrated construction, the handle 82 is adjacent the rear of the operator seat 16 so that an operator can operate the actuator assembly 78 without leaving the operator seat 16.

Two elongated members or actuator plates 84 are coupled to opposite ends of the control shaft 80. Each of the actuator plates 84 has a first or forward end 86 and a second or rearward end 88. The rearward ends 88 are coupled to opposite ends of the control shaft 80 for pivotal movement with the control shaft 80 about the control shaft axis A. Actuator rods 90 are pivotably coupled to the respective forward ends 86 of the actuator plates 84 at respective forward or third ends 91, and are pivotably coupled to the door 64 at respective rearward or fourth ends 93. Fasteners 92 (e.g., bolts, screws, pins, nails, rivets, and the like) extend through the third and fourth ends 91, 93, facilitating pivotal movement of the actuator rods 90 with respect to the actuator plates 84 and the door 64. A stop 94 is coupled to each of the actuator plates 84 adjacent the actuator rods 90 to limit pivotal movement of the actuator plate 84 about the control shaft axis A. In the illustrated embodiment, the stops 94 are fasteners, however, in other constructions of the present invention, the stops 94 can alternately be any other similar protuberance coupled to or formed by the actuator plates 84.

As best shown in FIGS. 2 and 4, the actuator assembly 78 also includes a door stop 96 One end of the door stop 96 is pivotably coupled to the rearward edge of the left side wall 46 adjacent the actuator rod 90. The other end of the door stop 96 includes an arcuately-shaped notch 98. When the door 64 is closed, the door stop 96 hangs down from the left side wall 44. When the door 64 is opened, an operator can move the support into position to hold the door 64 in the open position (see FIG. 4). In particular, the operator can pivot the door stop 96 so that the arcuately-shaped notch 98 engages the fastener 92. Those skilled in the art will appreciate that other methods of holding the door 64 in the open position can be used. For example, the handle 82 can include a catch (not shown) which prevents the handle 82 from returning to a home position. Similarly, the hopper 40 can include a rod or strut (not shown), which extends through the interior space 54 and holds the door 64 in the open position.

As shown in FIGS. 1–4, the hopper 40 also includes a latching mechanism 100. The latching mechanism 100 includes protuberances 102 (e.g. pins, screws, knobs, protrusions, and the like) extending outwardly from the oppositely facing lower ends of the door 64. The latching mechanism 100 also includes latches 104. Fasteners 106 pivotably couple central portions of the latches 104 to the lower ends of the right and left side walls 44, 46 adjacent the protuberances 102. Rearward ends of the latches 104 define notches 107 (see FIG. 4) that act as hooks, selectively engaging the protuberances 102 to lock the door 64 in a closed position and disengaging the protuberances 102 to unlock the door 64 for opening. Latch rods 108 are each pivotably coupled at one end to respective forward ends of the latches 104 and at the other end to the respective actuator plates 84. Therefore, operation of the actuator 78 to open and close the door 64 also effects unlocking and locking of the latching mechanism 100.

With reference to FIGS. 1 and 2, during operation of the lawn tractor 10, the hopper 40 is filled with yard waste W via the duct 36. When the operator determines that the hopper 40 is full and/or when the operator has finished working, the operator empties the hopper 40 into a waste pile or waste bins (not shown) by depressing the handle 82 (as shown by arrow 112). Because the handle 82 is adjacent the rear of the operator seat 16, the operator can depress the handle 82 from the seated position in the operator seat 16, or alternately, the operator can depress the handle 82 while standing next to the lawn tractor 10.

Still referring to FIG. 2, when the handle 82 is initially depressed, the control shaft 80 rotates about the control shaft axis A (as shown by arrow 114) and the actuator plates 84 are pivoted out of an over-center position with respect to the actuator rods 90. The initial movement of the actuator plates 84 forces the latch rods 108 rearwardly (as shown by arrows 116). The rearward motion of the latch rods 108 causes the latches 104 to pivot about the respective fasteners 106 (as shown by arrow 118). As the latches 104 pivot about the fasteners 106, the notches 107 (see FIG. 4) are moved away from the protuberances 102, thereby unlatching the latching mechanism 100.

Continued movement of the handle 82 causes further pivoting of the actuator plates 84, which forces the actuator rods 90 rearwardly and upwardly (as shown by arrows 120). The rearward and upward motion of the actuator rods 90 causes the door 64 to pivot about the hinges 60 toward the open position (as shown in FIG. 4 and in phantom in FIG. 3). As the actuator rods 90 move the door 64 toward the open position, the door 64 moves the sweep assembly 68 rearwardly from the forward portion of the interior space 54 toward the opening 58 (as shown in FIG. 4 by arrow 122). As the sweep assembly 68 moves rearwardly, the sweep 76 moves yard waste W toward the opening 58 and out of the hopper 40.

The operator can depress and release the handle 82 repeatedly to achieve multiple passes with the sweep 76 through the interior space 54. As the sweep 76 moves upwardly toward the front wall 48, much of the yard waste W remaining in the hopper 40 will pass over or under the sweep 76 toward the rearward side of the sweep 76. In a subsequent sweeping motion toward the opening 58, the sweep 76 will move this additional yard waste W out of the opening 58. This process can be repeated until substantially all of the yard waste W is removed from the hopper 40.

After the hopper 40 has been emptied, the operator releases the handle 82 and the weight of the door 64 causes the door 64 to pivot about the hinges 60 toward the closed position (as shown in FIGS. 1 and 2). With respect to FIG. 3, as the door 64 returns to the closed position, the door 64 moves the sweep assembly 68 upwardly and forwardly into the interior space 54 toward the front wall 48. Also, as the door 64 returns to the closed position, the door 64 forces the actuator rods 90 forwardly and downwardly (as show by arrow 126), causing the actuator plates 84 and the control shaft 80 to pivot about the control shaft axis A (as shown by arrow 128). As the actuator plates 84 pivot, the latch rods 108 are pulled forwardly (as shown by arrow 129) causing the latches 104 to pivot about fasteners 106 and latch the door 64 in the closed position. The operator continues to move the handle 82 rearwardly to the substantially upright position shown in FIGS. 1–3 so that the actuator plates 84 pivot to the over-center position, wherein the actuator rods 90 hit the respective stops 94. This over-center position will substantially hold the door 64 in the closed position and the latch 104 in the latched position.

While not shown, those skilled in the art will appreciate that some form of locking mechanism can be utilized to maintain the actuator plates 84 in the over-center position during operation of the lawn tractor 10. For example, the locking mechanism can include a hook and/or latch, that engages the handle 82 and maintains the handle 82 in the upright position shown in FIGS. 1–3, thereby preventing the handle 82 from moving forwardly and preventing the actuator plates 84 from pivoting out of their respective over-center positions.

The embodiments described above and illustrated in the drawings are presented by way of example only and are not intended as a limitation upon the concepts and principles of the present invention. As such, it will be appreciated by one having ordinary skill in the art, that various changes in the elements and their configuration and arrangement are possible without departing from the spirit and scope of the present invention as set forth in the appended claims.

For example, one having ordinary skill in the art will appreciate that the size and shape of the hopper 40 can be changed significantly without departing from the spirit and scope of the present invention. Also, in some constructions, the bottom wall 52 can be arcuately-shaped, or alternatively, the bottom wall 52 can be substantially parallel to the top wall 50. Changing the contour or configuration of the bottom wall may require a corresponding modification to the sweep assembly 68.

As another example, the sweep assembly 68 described above and illustrated in the figures can be otherwise configured to move independently from the door 64 and be operable via movement of the actuator 78. More particularly, part of the actuator can extend through an aperture (not shown) in the hopper 40 and be directly connected to a sweep assembly that is not coupled to the door 64. Similarly, one having ordinarily skill in the art will appreciate that the sweep assembly can be differently configured. For example, the frame 71 can include only one arm 72 or more than two arms 72. Additionally, the sweep assembly 68 could be modified so that the sweep is configured to engage and move along the interior side of one of the right and left walls 44, 46.

As such, the functions of the various elements and assemblies of the present invention can be changed to a significant degree without departing from the spirit and scope of the present invention.

What is claimed is:

1. A hopper for a lawn tractor, the hopper comprising:
   a plurality of walls, the walls together defining an interior space and an opening communicating with the interior space;
   a door movably coupled to at least one of the plurality of walls and movable between a closed position, wherein the door substantially covers the opening, and an open position, wherein the opening is at least partially uncovered; and
   a sweep assembly that moves within the interior space as the door moves between the closed and open positions so as to sweep yard waste, accumulated on at least one of the plurality of walls, out of the interior space through the opening.

2. The hopper of claim 1, wherein the sweep assembly includes a frame coupled to the door and a sweep coupled to the frame, the sweep engaging at least one of the plurality of walls.

3. The hopper of claim 2, wherein the sweep is a flexible member.

4. The hopper of claim 1, wherein at least one of the plurality of walls is sloped downwardly toward the opening and is engageable by the sweep assembly to sweep yard waste accumulated thereon out of the interior space through the opening.

5. The hopper of claim 1, further comprising a latching mechanism coupled to at least one of the plurality of walls, the latching mechanism being operable to secure the door in the closed position.

6. The hopper of claim 1, further comprising an actuator coupled to the hopper and being operable to move the door between the closed position and the open position.

7. A hopper for a lawn tractor, the hopper comprising:
   a plurality of walls, the walls together defining an interior space and an opening communicating with the interior space;
   a door movably coupled to at least one of the plurality of walls and movable between a closed position, wherein the door substantially covers the opening, and an open position, wherein the opening is at least partially uncovered;
   a sweep assembly movable within the interior space when the door is moved between the closed and open positions; and
   an actuator coupled to the hopper and being operable to move the door between the closed position and the open position, wherein the actuator includes
      a first elongated member having a first end and a second end, the first elongated member being pivotably coupled to at least one of the plurality of walls;
      a second elongated member having a third end and a fourth end, the third end being pivotably coupled to the second end and the fourth end being pivotably coupled to the door; and
      a handle coupled to the first end for pivoting the first elongated member with respect to the at least one of the plurality of walls to which the first elongated member is pivotably coupled.

8. A hopper for a lawn tractor, the hopper comprising:
   a plurality of walls, the walls together defining an interior space and an opening communicating with the interior space;
   a door movably coupled to at least one of the plurality of walls and movable between a closed position, wherein the door substantially covers the opening, and an open position, wherein the opening is at least partially uncovered;
   a sweep assembly movable within the interior space when the door is moved between the closed and open positions;
   an actuator coupled to the hopper and being operable to move the door between the closed position and the open position; and
   a latching mechanism coupled to at least one of the plurality of walls, the latching mechanism having a locked condition, wherein the latching mechanism secures the door in the closed position, and an unlocked condition, wherein the door is movable to the open position, and wherein the actuator is coupled to the latching mechanism and is operable to move the latching mechanism between the locked condition and the unlocked condition.

9. A lawn tractor comprising:
   a plurality of wheels supporting a chassis;
   a mower deck coupled to the chassis, the mower deck housing a cutting blade; and
   a hopper including:
      a plurality of walls, the walls together defining an interior space communicating with the mower deck and an opening communicating with the interior space;
      a door movably coupled to at least one of the plurality of walls and movable between a closed position, wherein the door substantially covers the opening, and an open position, wherein the opening is at least partially uncovered; and
      a sweep assembly that moves within the interior space as the door moves between the closed and open positions so as to sweep yard waste, accumulated on at least one of the plurality of walls, out of the hopper through the opening.

10. The lawn tractor of claim 9, wherein the lawn tractor includes an operator seat supported by the chassis and an actuator positioned at least partially adjacent the operator seat, the actuator being operable to move the door between the closed position and the open position.

11. The lawn tractor of claim 9, wherein the sweep assembly includes a frame coupled to the door and a sweep coupled to the frame, the sweep engaging at least one of the plurality of walls.

12. The lawn tractor of claim 11, wherein the sweep is a flexible member.

13. The lawn tractor of claim 9, wherein at least one of the plurality of walls is sloped downwardly toward the opening.

14. The lawn tractor of claim 9, further comprising a latching mechanism coupled to at least one of the plurality of walls, the latching mechanism being operable to secure the door in the closed position.

15. The lawn tractor of claim 9, further comprising an actuator coupled to the hopper and being operable to move the door between the closed position and the open position.

16. A lawn tractor comprising:
a plurality of wheels supporting a chassis;
a mower deck coupled to the chassis, the mower deck housing a cutting blade; and
a hopper including:
a plurality of walls, the walls together defining an interior space communicating with the mower deck and an opening communicating with the interior space;
a door movably coupled to at least one of the plurality of walls and movable between a closed position, wherein the door substantially covers the opening, and an open position, wherein the opening is at least partially uncovered;
a sweep assembly movable within the interior space when the door is moved between the closed and open positions; and
an actuator coupled to the hopper and being operable to move the door between the closed position and the open position, wherein the actuator includes
a first elongated member having a first end and a second end, the first elongated member being pivotably coupled to at least one of the plurality of walls;
a second elongated member having a third end and a fourth end, the third end being pivotably coupled to the second end and the fourth end being pivotably coupled to the door; and
a handle coupled to the first end for pivoting the first elongated member with respect to the at least one of the plurality of walls to which the first elongated member is pivotably coupled.

17. A lawn tractor comprising:
a plurality of wheels supporting a chassis;
a mower deck coupled to the chassis, the mower deck housing a cutting blade; and
a hopper including;
a plurality of walls, the walls together defining an interior space communicating with the mower deck and an opening communicating with the interior space;
a door movably coupled to at least one of the plurality of walls and movable between a closed position, wherein the door substantially covers the opening, and an open position, wherein the opening is at least partially uncovered; and
a sweep assembly movable within the interior space when the door is moved between the closed and open positions;
an actuator coupled to the hopper and being operable to move the door between the closed position and the open position; and
a latching mechanism coupled to at least one of the plurality of walls, the latching mechanism having a locked condition, wherein the latching mechanism secures the door in the closed position, and an unlocked condition, wherein the door is movable to the open position, and wherein the actuator is coupled to the latching mechanism and is operable to move the latching mechanism between the locked condition and the unlocked condition.

18. A hopper for a lawn tractor, the hopper comprising:
a plurality of walls, the walls together defining an interior space and an opening communicating with the interior space;
a door movably coupled to at least one of the plurality of walls and movable between a closed position, wherein the door substantially covers the opening, and an open position, wherein the opening is at least partially uncovered;
a sweep assembly coupled to the door and movable within the interior space; and
an actuator operable to move the door from the closed position toward the open position, thereby moving the sweep assembly toward the opening to sweep yard waste, accumulated on at least one of the walls, out of the interior space through the opening.

19. The hopper of claim 18, wherein the sweep assembly includes a frame coupled to the door and a sweep coupled to the frame, the sweep being a flexible member and engaging at least one of the plurality of walls, and the hopper further including a latching mechanism coupled to the at least one of the plurality of walls, the latching mechanism having a locked condition, wherein the latching mechanism secures the door in the closed position, and an unlocked condition, wherein the door is movable to the open position, and wherein the actuator is coupled to the latching mechanism and is operable to move the latching mechanism between the locked condition and the unlocked condition.

20. A method of operating a hopper for a lawn tractor, the hopper having a plurality of walls, the walls together defining an interior space for housing yard waste and an opening communicating with the interior space, a door movably coupled to at least one of the plurality of walls and movable between a closed position, in which the door substantially covers the opening, and an open position, in which the opening is at least partially uncovered, and a sweep assembly movable within the interior space, the method comprising:
moving the door from the closed position toward the open position; and
moving the sweep assembly within the interior space toward the opening so as to engage yard waste accumulated on at least one of the walls and sweep the yard waste out of the interior space through the opening.

21. The method of claim 20, wherein the sweep assembly includes a sweep, and wherein moving the sweep assembly within the interior space includes moving the sweep along at least one of the plurality of walls.

22. The method of claim 20, wherein the hopper includes a latching mechanism coupled to at least one of the plurality of walls, the latching mechanism having a locked condition, in which the latching mechanism secures the door in the closed position, and an unlocked condition, in which the door is movable toward the open position, and wherein the method further includes moving the latching mechanism from the locked condition to the unlocked condition.

23. The method of claim 20, wherein the sweep assembly moves toward the opening at substantially the same time as the door moves from the closed position toward the open position.

24. The method of claim 20, wherein the sweep assembly is coupled to the door such that moving the door from the closed position toward the open position moves the sweep assembly within the interior space toward the opening.

25. A hopper for collecting yard waste, the hopper comprising:
a plurality of walls, the walls together defining an interior space and an opening communicating with the interior space, the walls including a bottom wall having a front edge facing the opening;

a door movable between a closed position, wherein the door at least substantially covers the opening, and an open position, wherein the opening is at least partially uncovered; and a sweep assembly that is coupled to the door so as to move when the door moves, the sweep assembly having a sweep that is configured to move along the bottom wall toward the front edge thereof as the door moves between the closed and open positions.

26. The hopper as recited in claim 25, wherein the sweep assembly further comprises a support extending rearwardly and downwardly from the door to the sweep.

27. The hopper as recited in claim 25, wherein the walls additionally include side walls having front edges, and wherein the front edge of the bottom wall is at least generally coplanar with the front edge of side walls.

28. The hopper as recited in claim 25, wherein at least a portion of the bottom wall is at least generally flat and extends downwardly and forwardly from a rear edge thereof toward the front edge thereof.

29. A riding garden implement comprising:

a plurality of wheels supporting a chassis;

a mower deck coupled to the chassis, the mower deck housing a cutting blade; and a hopper including:
 a plurality of walls, the walls together defining an interior space communicating with the mower deck and an opening communicating with the interior space;
 a door movably coupled to at least one of the plurality of walls and movable between a closed position, wherein the door substantially covers the opening, and an open position, wherein the opening is at least partially uncovered; and
 a sweep assembly that moves within the interior space as the door moves between the closed and open positions so as to sweep yard waste, accumulated on at least one of the plurality of walls, out of the hopper through the opening.

30. The riding garden implement of claim 29, wherein the riding garden implement includes an operator seat supported by the chassis and an actuator positioned at least partially adjacent the operator seat, the actuator being operable to move the door between the closed position and the open position while the operator is seated on the operator seat.

31. The riding garden implement of claim 29, wherein the sweep assembly includes a frame coupled to the door and a sweep coupled to the frame, the sweep engaging at least one of the plurality of walls.

32. The riding garden implement of claim 31, wherein the sweep is a flexible member.

33. The riding garden implement of claim 29, wherein at least one of the plurality of walls is sloped downwardly toward the opening.

34. The riding garden implement of claim 29, further comprising a latching mechanism coupled to at least one of the plurality of walls, the latching mechanism being operable to secure the door in the closed position.

35. The riding garden implement of claim 29, further comprising an actuator coupled to the hopper and being operable to move the door between the closed position and the open position.

36. The riding lawn tractor of claim 29, wherein the riding garden implement is a lawn tractor.

37. A riding garden implement comprising:

a plurality of wheels supporting a chassis;

a mower deck coupled to the chassis, the mower deck housing a cutting blade;

an operator seat supported by the chassis; and a hopper at least indirectly supported on the chassis, the hopper including a plurality of walls, the walls together defining an interior space communicating with the mower deck and an opening communicating with the interior space;
 a sweep assembly at least a portion of which is movably positioned in the hopper and which is selectively actuatable to sweep yard waste, accumulated on at least one of the plurality of walls, out of the hopper through the opening; and an actuator positioned at least partially adjacent the operator seat, the actuator being manually operable by an operator stationed on the operator seat to actuate the sweep assembly to sweep yard waste out of the hopper through the opening.

38. The riding lawn tractor of claim 37, wherein the hopper further comprises a door movably coupled to at least one of the plurality of walls and movable between a closed position, wherein the door substantially covers the opening, and an open position, wherein the opening is at least partially uncovered, and wherein the sweep assembly moves within the interior space as the door moves between the closed and open positions so as to sweep yard waste out of the hopper through the opening.

* * * * *